(12) United States Patent
Mildner et al.

(10) Patent No.: US 9,079,616 B2
(45) Date of Patent: Jul. 14, 2015

(54) MOTOR VEHICLE BODY WITH LIGHTWEIGHT COMPONENT

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/091,359

(22) Filed: Nov. 27, 2013

(65) Prior Publication Data
US 2014/0145469 A1    May 29, 2014

(30) Foreign Application Priority Data
Nov. 28, 2012   (DE) .......................... 10 2012 023 653

(51) Int. Cl.
B62D 29/00 (2006.01)
B62D 25/00 (2006.01)
B62D 25/20 (2006.01)
B62D 27/02 (2006.01)
B62D 25/04 (2006.01)

(52) U.S. Cl.
CPC .............. B62D 29/005 (2013.01); B62D 25/00 (2013.01); B62D 25/04 (2013.01); B62D 25/20 (2013.01); B62D 27/026 (2013.01)

(58) Field of Classification Search
USPC ............. 296/193.06, 193.07, 193.01, 203.03, 296/187.12, 193.05, 209
See application file for complete search history.

(56) References Cited

U.S. PATENT DOCUMENTS

| 6,910,732 | B2* | 6/2005 | Miyoshi et al. | 296/203.03 |
| 7,815,247 | B2* | 10/2010 | Obayashi | 296/193.06 |
| 2006/0097549 | A1* | 5/2006 | Fischer et al. | 296/203.03 |
| 2007/0236051 | A1* | 10/2007 | Poss et al. | 296/203.03 |
| 2009/0309391 | A1* | 12/2009 | Krause | 296/201 |
| 2010/0194147 | A1* | 8/2010 | Aul et al. | 296/193.06 |
| 2010/0308623 | A1* | 12/2010 | Bodin et al. | 296/193.06 |
| 2010/0327630 | A1* | 12/2010 | Klimek et al. | 296/203.03 |
| 2011/0241383 | A1* | 10/2011 | Shin et al. | 296/193.06 |
| 2011/0241384 | A1* | 10/2011 | Mori | 296/193.06 |

FOREIGN PATENT DOCUMENTS

| DE | 4124627 A1 | 1/1993 |
| DE | 102006027765 A1 | 12/2002 |
| DE | 102007023833 A1 | 8/2008 |

(Continued)

OTHER PUBLICATIONS

German Patent Office, German Patent Search Report for Application No. 102012023653.0 dated Jul. 25, 2013.

*Primary Examiner* — Glenn Dayoan
*Assistant Examiner* — Sunsurraye Westbrook
(74) *Attorney, Agent, or Firm* — Ingrassia Fisher & Lorenz PC

(57) ABSTRACT

A motor vehicle body includes, but is not limited to a lightweight component of a composite material and a metallic structure, on which the lightweight component is fastened. The metallic structure includes, but is not limited to a first groove, in which a first edge strip of the lightweight component engages. Between two surfaces of the first edge strip facing away from one another and side walls of the first groove located opposite these surfaces, an adhesive layer is formed.

17 Claims, 3 Drawing Sheets

(56) References Cited

FOREIGN PATENT DOCUMENTS

| | | | |
|---|---|---|---|
| DE | 102008032344 | A1 | 1/2010 |
| DE | 102008060358 | A1 | 8/2010 |
| DE | 102010013344 | A1 | 10/2011 |
| DE | 102010054935 | A1 | 6/2012 |

* cited by examiner

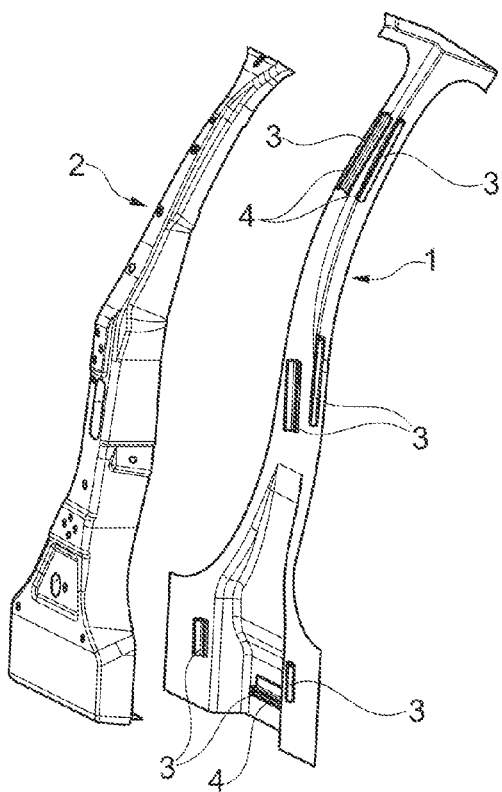
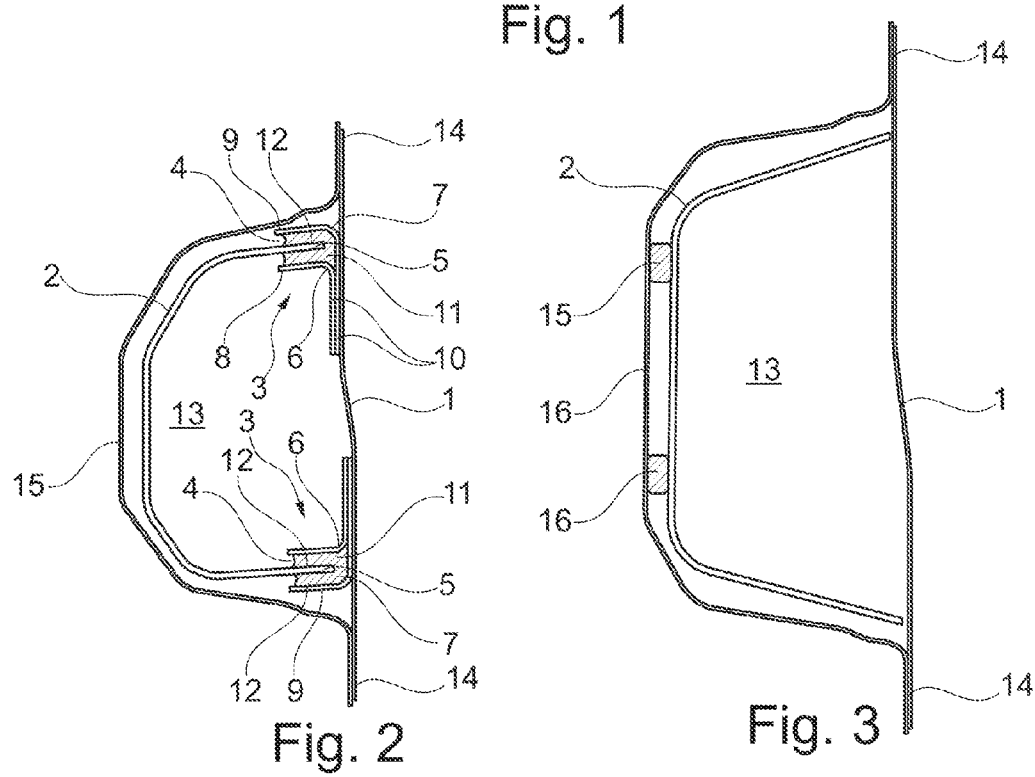
Fig. 1
Fig. 2
Fig. 3

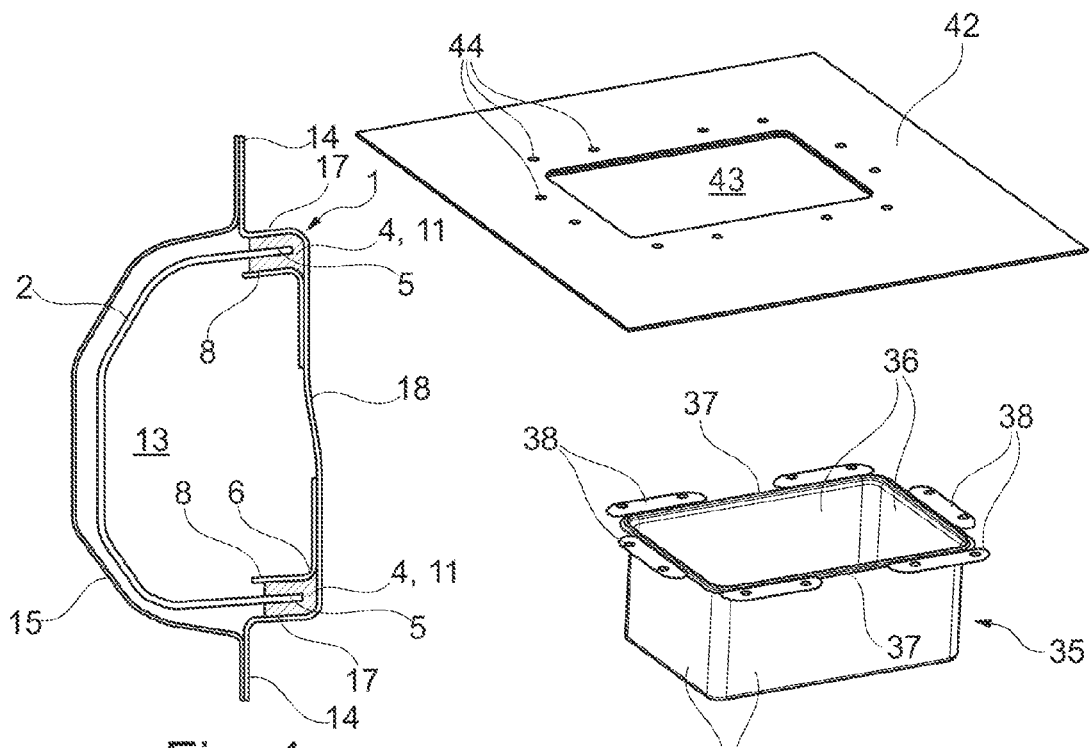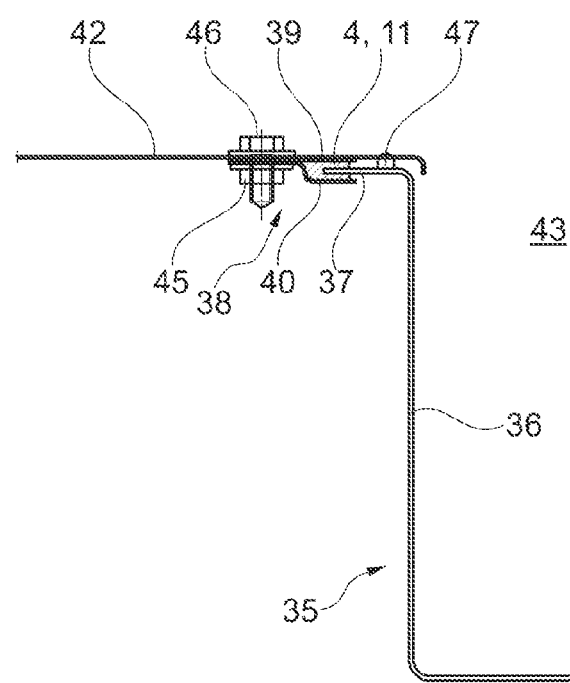

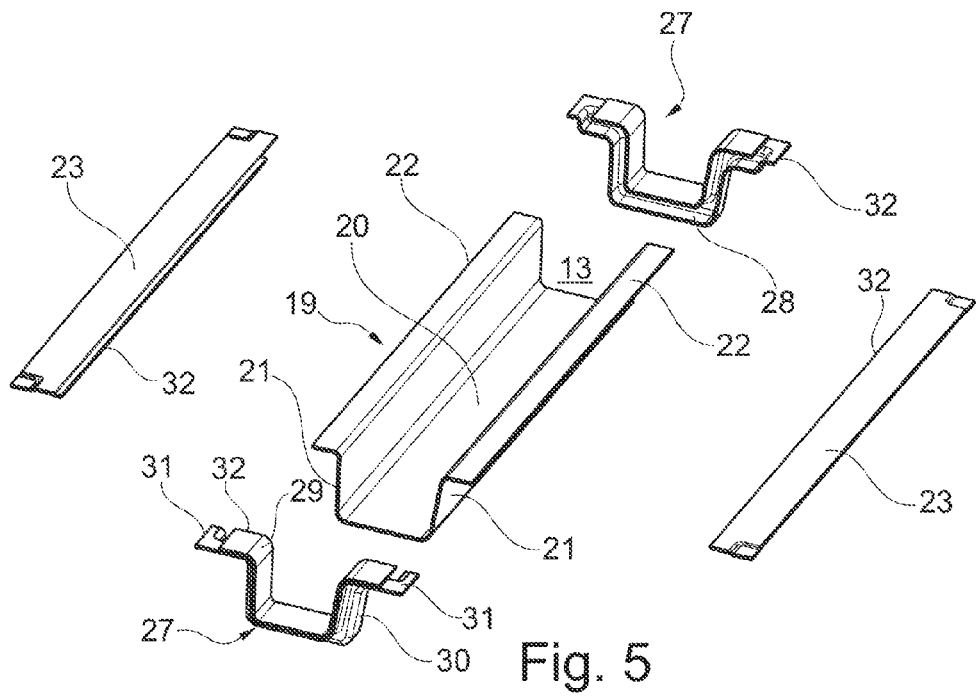
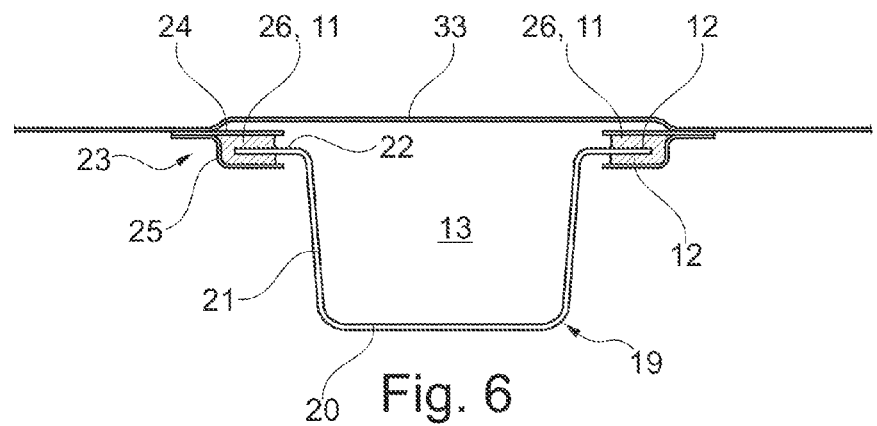
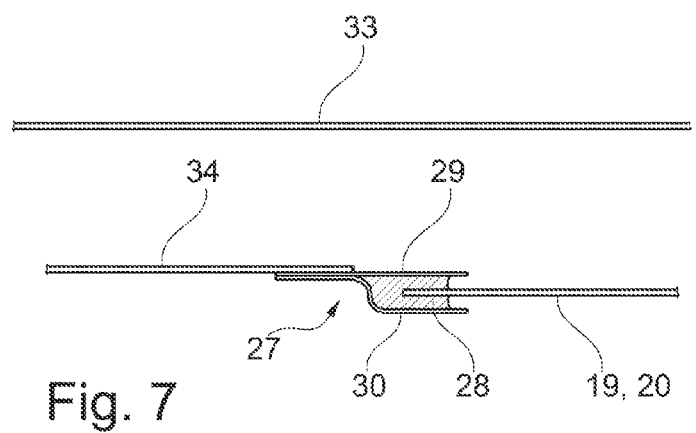

MOTOR VEHICLE BODY WITH LIGHTWEIGHT COMPONENT

CROSS-REFERENCE TO RELATED APPLICATION

This application claims priority to German Patent Application No. 10 2012 023 653.0, filed Nov. 28, 2012, which is incorporated herein by reference in its entirety.

TECHNICAL FIELD

The technical field relates to a motor vehicle body, which comprises at least one lightweight component of a composite material.

BACKGROUND

Replacing components in a motor vehicle body which are conventionally produced of metal with components of composite materials, in particular of fiber-reinforced plastics, promises substantial weight savings and because of this also the possibility of lowering the fuel consumption of the vehicle. For this reason, considerable efforts are undertaken in order to render composite materials utilizable in bodywork construction. Problems are posed in this respect among other things by the production of a sufficiently strong and loadable connection between components of composite material and such of metal.

From DE 10 2008 032 344 A1 a pillar for a motor vehicle body is known, which comprises an inner shell, an outer shell and a reinforcement box of carbon fiber-reinforced plastic enclosed between inner and outer shell. Inner and outer shells are welded together and the reinforcement box is joined through adhesive and/or rivets with a connection adaptor inserted between the shells.

Rivet or screw connections require a perforating of the lightweight component, as a result of which the fiber orientation is interrupted and thus the structure of the lightweight component weakened on the connecting points. When bonding is employed instead, the structural weakening of the lightweight component can be avoided but flat bonding between surfaces of metallic component and lightweight component located opposite one another generally produces only a low load capacity, since as a consequence of different deformability of the metal and of the composite material, material shifts occur on the bond which cause the latter to fatigue and finally tear.

In view of the foregoing, at least one is to create a motor vehicle body in which a lightweight component of composite material and a metallic structure are joined together in a manner which is simple, rationally to produce and yet durably loadable. In addition, other objects, desirable features and characteristics will become apparent from the subsequent summary and detailed description, and the appended claims, taken in conjunction with the accompanying drawings and this background.

SUMMARY

A motor vehicle body is provided with a lightweight component of a composite material and a metallic structure, on which the lightweight component is fastened, the metallic structure comprises a first groove, in which a first edge strip of the lightweight component engages, and between two surfaces facing away from one another of the first edge strip and side walls located opposite dead edge strip of the first groove an adhesive layer is formed. In that the edge strip of the lightweight component is encased on both sides by the metallic structure and bonded to the latter, its deformation behavior under dynamic loading adapts to that of the metal structure, so that a stress of the adhesive layer, which could lead to a tearing-open, is prevented. The metallic structure preferentially comprises two profile elements which are connected to one another, of which each forms a side wall each of the first groove.

According to an embodiment, the profile elements can have an L-shaped cross section with a first and a second leg each. The first legs of the profile elements form the side walls of the first groove and the second legs are fastened to one another. An assembly, in which the lightweight component is joined together with the profile elements, can be joined together with further metallic structure elements like a conventional metallic component via the second leg.

According to another embodiment, one of the profile elements can have a Z-shaped cross section with a middle leg and two outer legs adjoining the middle leg. One of the outer legs forms a side wall of the first groove and the other outer leg is fastened to the other profile element. The other profile element can be rectilinear in cross section.

Preferentially, the lightweight component comprises a second edge strip on an edge facing away from the first edge strip, and the second edge strip engages in a second groove of the metallic structure. Thus, the metallic structure and the lightweight component can mutually complement one another to form a highly loadable hollow structure with a closed cross section. Thus it is possible in particular with a single-part plate-like lightweight component that is easily and cost-effectively to produce, to form a highly loadable structure, and the major effort which is conventionally connected with the production of a hollow body of composite material is omitted.

In order to be able to form a hollow space together with the metal structure, the lightweight component preferentially has a top hat or U-shaped cross section in a plane which crosses both the edge strips engaging in the grooves of the metallic structure, so that the edge strips can each be formed through brim portions of the top hat cross section or free ends of the legs of the U-cross section. The metallic structure can practically comprise a baseplate, to which one side wall each of the first and the second groove is joined. The respective other side wall can likewise be joined to the baseplate or be a one-piece constituent part of the baseplate.

The joined side walls preferentially form a first leg of profile elements each, each of which has a second leg fastened to the baseplate. When the second legs of these profile elements extend in front of a hollow space of the lightweight component that is open towards the baseplate, a particularly compact cross section of the construction of the lightweight component and metallic structure can be obtained, which in particular is highly suitable for a pillar of the motor vehicle body. The baseplate and a covering fastened to the baseplate on both sides of the lightweight component can enclose the lightweight component so that it is not visible from the outside.

Two rectilinearly elongated profiles, which form the first and the second groove of the metal structure, can be joined to form a frame encasing the lightweight component and thus form an assembly with the lightweight component that can be handled as a unit, which can be mounted on other metallic parts of the motor vehicle body in a similar manner to that of a conventional purely metallic component. The frame can practically comprise curved profiles corresponding to the cross section of the lightweight component, which join the rectilinearly elongated profiles, thus enclosing the lightweight component over its entire circumference.

According to another embodiment, the metallic structure comprises a floor plate of a passenger cell or of a load compartment, and the lightweight component forms a cross member crossing the floor plate. According to another embodiment, the lightweight component can be formed as a container which fills out an aperture of the metallic structure, e.g., an aperture of the floor plate, in order to thereby create additional stowage space below the floor plate.

In addition, other objects, desirable features and characteristics will become apparent from the subsequent summary and detailed description, and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and:

FIG. 1 is parts of a B-pillar of a motor vehicle body according to an embodiment;

FIG. 2 is a first cross section of a B-pillar joined making use of the parts shown in FIG. 1;

FIG. 3 is a second cross section of the B-pillar;

FIG. 4 is a cross section that is analogous to FIG. 2 according to another embodiment;

FIG. 5 is a lightweight component and parts of a frame encasing the lightweight component in an expanded view according to a second configuration of the invention;

FIG. 6 is the lightweight component mounted under a floor plate of a motor vehicle body from FIG. 5 in a cross section;

FIG. 7 is the floor plate and the lightweight component in a longitudinal section;

FIG. 8 is a lightweight component and a floor plate according to a third configuration of the invention; and FIG. 9 is a cross section through a connection between the lightweight component and the floor plate from FIG. 8.

DETAILED DESCRIPTION

The following detailed description is merely exemplary in nature and is not intended to limit application and uses. Furthermore, there is no intention to be bound by any theory presented in the preceding or summary or the following detailed description.

FIG. 1 shows in a perspective view an inner closing part 1 formed from a flat sheet metal cutting, which in a finish-joined motor vehicle body will form a wall of a B-pillar facing the passenger cell. Located opposite the inner closing part 1, a lightweight component 2 of glass, carbon or aramid fiber-reinforced plastic is shown. The lightweight component 2 is plate-shaped in the sense that its three-dimensional shape as that of the inner closing part 1 could be obtained by forming a plate of flat material and is free of hollow spaces. However, it is not required that the lightweight component 2 is obtained from flat material through a forming process. The lightweight component 2 that can also be obtained in that a mold is covered with mats of synthetic resin impregnated fiber material and subsequently the mats are pressed and heated between said mold and a complementary mold in order to obtain the lightweight component 2 in the desired three-dimensional form from the start.

Profiles 3, welded to the inner closing part 1 or fastened thereto in another suitable manner, form grooves 4 in various locations of the inner closing part 1 which are open towards the lightweight component 2, which, as shown in FIG. 2, receive an edge strip 5 of the lightweight component 2. The profiles 3 are joined together of two profile elements 6, 7 each in the shape of sheet metal strips which are bent in an L-shaped manner. One leg each of each profile element 6, 7 forms a side wall 8, 9 of the groove 4, the two other legs 10 are spot-welded to one another and to the inner closing part 1. A rigid adhesive layer 11 fills out the grooves 4 between the side walls 8, 9 and surfaces 12 of the edge strip 5 located opposite these.

The legs 10 of the profile elements 6, 7 abutting the closing part 1 extend in each case in front of a hollow space 13 of the lightweight component 2 which is open towards the inner closing part 1. Thus, edges 14 of the inner closing part 1 which laterally protrude over the lightweight component 2 remain disposable in order to fasten thereon an outer side wall 15 which is not shown in FIG. 1 and which extends in an arch about the lightweight component 2—which is shown in FIGS. 2 and 3, but not in FIG. 1. In that the lightweight component 2 is fixedly held in the grooves 4 of the profiles 3 in a plurality of locations distributed over its height, it forms, together with the inner closing part 1, a highly loadable hollow structure which makes possible realizing a required load ability of the B-pillar with small cross-sectional dimensions and correspondingly low weight.

No profiles 3 are located in the section plane of FIG. 3 and the lightweight component 2 does not touch the inner closing part 1. Instead, the lightweight component 2 is joined to the outer side wall 15 through adhesive 16 applied to the outside. FIG. 4 shows a modification of the B-pillar in a cross section that is analogous to that of FIG. 2. Here, the inner closing part 1 has a flat top hat-like cross section with two side walls 17, each of which join a middle piece 18 with the edges 14 projecting laterally and extend transversely to these. Each of these form side walls of grooves 4, whose other side walls 8 are formed by an angled profile element 6 of the type already shown in FIG. 2.

In an expanded view, FIG. 5 shows a lightweight component 19 of fiber-reinforced plastic according to a second configuration of the invention. It has a top hat-like cross section with a hollow space 13 limited by a floor wall 20 and two side walls 21 and edge strips 22 projecting from upper side walls 21 to the outside. Two rectilinearly elongated profiles 23 are provided in order to be fitted onto the edge strips 22 from a lateral direction. As is evident in FIG. 6, the profiles 23 each comprise a profile element 24 in the form of a flat sheet metal strip and a profile element 25 that is offset in cross section, each of which form one of two side walls of a groove 26 receiving an edge strip 22. The flat profile elements 24 are longer than the offset ones 25 and protrude over these at both ends.

Two further profiles 27 each form grooves 28, which extend multiply angled in order to receive the edges of the lightweight component 19 on the face end. Like the rectilinear profiles 23, the angled profiles 27 are also joined together out of two profile elements 29, 30 of sheet metal welded together, of which each forms a side wall of the groove 28. Here, the upper sheet metal strip 29 which is flat in cross section is shorter than the lower, offset sheet metal strip 30, so that ends 31 of the offset sheet metal strip 30 are exposed as shown in FIG. 5. In that the protruding ends of the sheet metal strips 24 are welded together at these ends 31, a frame 32 enclosing the lightweight component 19 along its entire edge is obtained. By way of the frame 32, the lightweight component 19 can be installed like a conventional metal component making use of the assembly techniques such as welding, riveting etc. that is usual for this purpose.

FIG. 6 shows the lightweight component 19 installed under a floor plate 33 of a passenger cell or of a load compartment of a motor vehicle body in a cross section. The edge strips 22 engage with play in the grooves 26 formed by the profiles 23, and the intermediate space between the surfaces 12 of the edge strips 22 and side walls of the grooves 26 located opposite is filled out with solid adhesive 11.

FIG. 7 shows an end of the lightweight component 19 in a longitudinal section. Here, the profile 27 is fastened to a cross member extension 34, which like the lightweight component comprises a floor wall and side walls, of which in FIG. 7 only the floor wall is visible. Floor and side walls of the extension 34 extend slightly offset against the corresponding walls 20, 21 of the lightweight component 19, in extension of these up to a side member of the body which is not shown. The walls of the extension 34 can be unitarily joined or be connected through welding, screw connection etc.

A third embodiment is shown in an expanded perspective view in FIG. 8 and in a detail section in FIG. 9. A lightweight component 35 of fiber-reinforced plastic is formed here as a substantially cuboid box that is open on the top side, whose side walls 36 at their upper edge comprise a peripheral flange 37 projecting to the outside. A plurality of profiles 38 are bonded to the flange 37. As is visible in FIG. 9, the profiles 38 like the profiles 23, 27 of the second configuration, are each assembled from a flat and an offset profile element 39, 40 of sheet metal, each of which form a side wall of a groove 41 receiving the flange 37 and a surrounding adhesive layer 11. In a load compartment floor plate 42, which can be identical to the floor plate 33 of FIG. 5, 6, an aperture 43 is cut out, the edge lengths correspond to the lengths of the side walls 36 of the lightweight component 35. Drilled holes 44 of the floor plate 42 distributed about the aperture 43 and drilled holes of the profiles 38 equipped with weld nuts 45 arranged complementarily thereto are provided in order to fix the lightweight component 35 under the aperture 43 with the help of screws 46 inserted therein and in the process compress a sealing profile 47 between the top side of the flange 37 and the floor plate 42.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body, comprising:
    a lightweight component of a composite material;
    a metallic structure on which the lightweight component is fastened, wherein the metallic structure comprises a first groove in which a first edge strip of the lightweight component engages; and
    an adhesive layer is formed between two surfaces of the first edge strip facing away from one another and side walls of the first groove located opposite these surfaces.

2. The motor vehicle body according to claim 1, wherein the metallic structure comprises two components that are connected to one another.

3. The motor vehicle body according to claim 2,
    wherein the profile elements have an L-shaped cross section with a first leg and a second leg each, and
    wherein the first leg of the profile elements form the side walls of the first groove and the second leg are fastened to one another.

4. The motor vehicle body according to claim 2,
    wherein one of the profile elements comprises a Z-shaped cross section with a middle leg and two outer legs adjoining the middle leg, and
    wherein one of the outer legs forms a side wall of the first groove and the other outer leg is fastened to the other profile element.

5. The motor vehicle body according to claim 1, wherein the lightweight component comprises a second edge strip on an edge facing away from the first edge strip and in that the second edge strip engages in a second groove of the metallic structure.

6. The motor vehicle body according to claim 1, wherein the lightweight component is formed plate-like in one part.

7. The motor vehicle body according to claim 5, wherein the lightweight component comprises a U-shaped cross section in a plane crossing the two edge strips.

8. The motor vehicle body according to claim 5, wherein the metallic structure comprises a baseplate to which at least one side wall each of the first groove and the second groove is joined.

9. The motor vehicle body according to claim 8, wherein the at least one side wall each of the first groove and the second groove are legs of profile elements, each of which have a second leg which is fastened to the baseplate and extends in front of a hollow space of the lightweight component which is open towards the baseplate.

10. The motor vehicle body according to claim 8, wherein the baseplate and a covering fastened to the baseplate on both sides of the lightweight component that encloses the lightweight component.

11. The motor vehicle body according to claim 1, wherein said motor vehicle body comprises at least one pillar, in which the lightweight component forms a reinforcing structure.

12. The motor vehicle body according to claim 6, wherein two rectilinearly elongated profiles, which form the first groove and the second groove of the metallic structure, are joined to form a frame that encase edges of the lightweight component.

13. The motor vehicle body according to claim 12, wherein the frame furthermore comprises profiles that are curved corresponding to a cross section of the lightweight component, which join the rectilinearly elongated profiles.

14. The motor vehicle body according to claim 1, wherein the metallic structure comprises a floor plate of a passenger cell and the lightweight component is a cross member crossing the floor plate.

15. The motor vehicle body according to claim 1, wherein the lightweight component is formed as a container that fills out an aperture of the metallic structure.

16. The motor vehicle body according to claim 1, wherein the two components are two profile elements of which each forms a side wall of the first groove each.

17. The motor vehicle body according to claim 14, wherein the metallic structure comprises a load compartment and the lightweight component is the cross member crossing the floor plate.

* * * * *